United States Patent [19]

Mushinski et al.

[11] Patent Number: 4,884,385
[45] Date of Patent: Dec. 5, 1989

[54] INTERLEAVED SPIRAL WRAPPING OF FOAM PRODUCT AND STRETCH FILM FOR PACKAGING CARBONLESS PAPER ROLLS

[75] Inventors: Roger J. Mushinski; Charles E. Lewis; Lawrence J. Casey, all of Appleton, Wis.

[73] Assignee: Appleton Papers Inc., Appleton, Wis.

[21] Appl. No.: 21,919

[22] Filed: Mar. 4, 1987

[51] Int. Cl.[4] .............................................. B65B 11/04
[52] U.S. Cl. ........................................ 53/399; 53/449; 53/441
[58] Field of Search ................. 53/399, 449, 465, 172, 53/176, 211, 441, 472, 137

[56] References Cited

U.S. PATENT DOCUMENTS

| | | |
|---|---|---|
| 726,894 | 5/1903 | Ferres . |
| 1,091,139 | 3/1914 | Jagenberg . |
| 1,351,809 | 9/1920 | Sutherland . |
| 1,359,477 | 11/1920 | Miller . |
| 1,405,188 | 1/1922 | Coombs . |
| 1,541,962 | 6/1925 | Jagenberg . |
| 1,870,399 | 8/1932 | Butler ................................... 53/211 |
| 1,882,695 | 10/1932 | Aldrich ............................. 53/172 X |
| 2,026,282 | 12/1935 | Leguillon .......................... 53/449 X |
| 2,082,114 | 6/1937 | Littlefield . |
| 2,141,161 | 12/1938 | Bombard . |
| 2,644,282 | 7/1953 | Irvine . |
| 2,681,534 | 6/1954 | Way . |
| 2,716,315 | 8/1955 | Jacoby . |
| 2,803,935 | 8/1957 | Gibson . |
| 2,872,767 | 2/1959 | Clem . |
| 2,880,560 | 4/1959 | Gibson . |
| 3,019,573 | 2/1962 | Navikas . |
| 3,111,795 | 11/1963 | Trostel, Jr. et al. . |
| 3,407,565 | 10/1968 | Bender et al. . |
| 3,423,274 | 1/1969 | Lahm et al. ............................. 161/6 |
| 3,494,095 | 2/1970 | Valvano . |
| 3,495,375 | 2/1970 | Burhop et al. ........................ 53/441 |
| 3,501,363 | 3/1970 | Kirkpatrick ......................... 161/125 |
| 3,633,335 | 1/1972 | Johnson . |
| 3,660,958 | 5/1972 | Garrison ........................... 53/449 X |
| 3,678,646 | 7/1972 | Clark .................................. 53/587 X |
| 3,716,964 | 2/1973 | Reynolds et al. . |
| 3,857,486 | 12/1974 | Klebenoff, Jr. ........................ 53/399 |
| 3,863,425 | 2/1975 | Edwards et al. . |
| 3,895,711 | 7/1975 | Hiltunen et al. . |
| 3,924,375 | 12/1975 | Brenner et al. . |
| 3,928,939 | 12/1975 | Edwards ............................ 53/449 X |
| 3,986,611 | 10/1976 | Dreher . |
| 4,050,220 | 9/1977 | Lancaster et al. . |
| 4,077,179 | 3/1978 | Lancaster et al. . |
| 4,136,501 | 1/1979 | Connolly . |
| 4,137,690 | 2/1979 | Morgan . |
| 4,152,879 | 5/1979 | Shulman . |
| 4,172,108 | 11/1979 | Eglinton et al. . |
| 4,189,894 | 2/1980 | Laing . |
| 4,291,500 | 8/1981 | Mueller et al. . |
| 4,362,001 | 12/1982 | Cockerham, Jr. et al. . |
| 4,409,776 | 10/1983 | Usui . |
| 4,418,510 | 12/1983 | Lancaster ........................ 53/441 X |
| 4,450,668 | 5/1984 | Grossi . |
| 4,458,467 | 7/1984 | Shulman et al. . |
| 4,485,612 | 12/1984 | Piesen et al. . |
| 4,502,264 | 5/1985 | Flaherty . |
| 4,538,348 | 9/1985 | Treiber et al. . |
| 4,553,372 | 11/1985 | Back ................................. 53/214 X |
| 4,553,374 | 11/1985 | Lancaster et al. . |
| 4,565,051 | 1/1986 | Back ..................................... 53/441 |
| 4,590,746 | 5/1986 | Humphrey . |
| 4,628,667 | 12/1986 | Humphrey ....................... 53/587 X |
| 4,691,497 | 9/1987 | Lancaster ............................ 53/449 |
| 4,703,605 | 11/1987 | Ackerman ........................... 53/587 |
| 4,736,567 | 4/1988 | Pienta . |

FOREIGN PATENT DOCUMENTS

| | | |
|---|---|---|
| 105039 | 4/1984 | European Pat. Off. . |
| 44757 | 5/1970 | Finland . |
| 47739 | 7/1973 | Finland . |
| 48436 | 12/1973 | Finland . |
| 122875 | 12/1971 | Norway . |
| 817798 | 8/1959 | United Kingdom . |
| 1052568 | 12/1966 | United Kingdom . |

*Primary Examiner*—John Sipos
*Attorney, Agent, or Firm*—Birch, Stewart, Kolasch & Birch

[57] ABSTRACT

A method and apparatus are provided for producing a foam wrapped package for protecting a roll of pressure-sensitive carbonless copy paper. Interleaved foam and film are wrapped under tension around the outer periphery of the roll of carbonless paper by selectively rotating the roll and separately feeding packaging foam and stretch film toward the rotating roll.

13 Claims, 4 Drawing Sheets

INTERLEAVED SPIRAL WRAPPING OF FOAM PRODUCT AND STRETCH FILM FOR PACKAGING CARBONLESS PAPER ROLLS

BACKGROUND OF THE INVENTION

1. Field of the Invention

The present invention relates to a process for producing a foam wrap package, and, more particularly, to a process for wrapping and protecting a roll of pressure-sensitive carbonless copy paper by simultaneously wrapping interleaved layers of stretch film and packaging foam onto the roll of carbonless paper.

2. Description of Background Art

Heretofore, stretch wrapping machinery manufacturers have marketed equipment which combines spiral wrapping of stretch film with limited non-spiral wrapping of a single face corrugated medium or a kraft wrap. Traditionally, machines have been developed which provide foam wrap in one operation and then kraft wrap in a second operation, and have required a substantial amount of the wrapping process to be performed by hand.

Problems have occurred in the prior art with the existing foam/kraft packages. Specifically, these packages using kraft wrap cannot apply foam over the edge of a roll of pressure-sensitive carbonless paper without producing a bulky edge that makes roll stacking difficult. The absence of foam over the edge of the roll of carbonless paper leaves the roll subject to edge damage. Prior to this time a sufficient wrapping procedure or a final wrapped package has not been achieved in the art which would require only a relatively limited capital cost and produce a resultant packaged product which is easy to handle.

SUMMARY AND OBJECTS OF THE INVENTION

Accordingly, it is a primary object of the present invention to provide a process for producing a foam wrap package for protecting a roll of pressure-sensitive carbonless paper utilizing the simultaneous wrapping or interleaved layers of stretch film and packaging foam onto the roll of carbonless paper.

It is a further object of the present invention to provide a unique foam wrap package for protecting a roll of pressure-sensitive carbonless paper which can be easily handled without damaging the carbonless paper and which can be achieved with low production costs.

The objects of the present invention are fulfilled by a process for producing a foam wrap package for protecting a roll of pressure-sensitive carbonless paper wherein a layer of stretch film is fed toward a roll of carbonless paper which has been located in a wrapping position. A layer of packaging foam is then fed toward the roll of carbonless paper in the wrapping position subsequent to the feeding of the stretch film. The roll is rotated while in the wrapping position for simultaneously interleaving the stretch film and the packaging foam during a wrapping operation. The feeding of the packaging foam to the roll of carbonless paper is terminated, and the feeding of the stretch film to the roll is terminated subsequent to the termination of the packaging foam.

A resultant foam wrap package produced by the process for protecting a roll of pressure-sensitive carbonless paper includes interleaved foam and film wrapped around the outer periphery of the roll of carbonless paper, the interleaved foam and film overlapping the edges of the roll. Additionally, first and second end pieces are secured to the flat side walls thereof with double-faced splicing tape and flanged plastic core plugs. The foam wrap package may thus be easily handled without damaging the roll of carbonless paper.

Further scope of applicability of the present invention will become apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
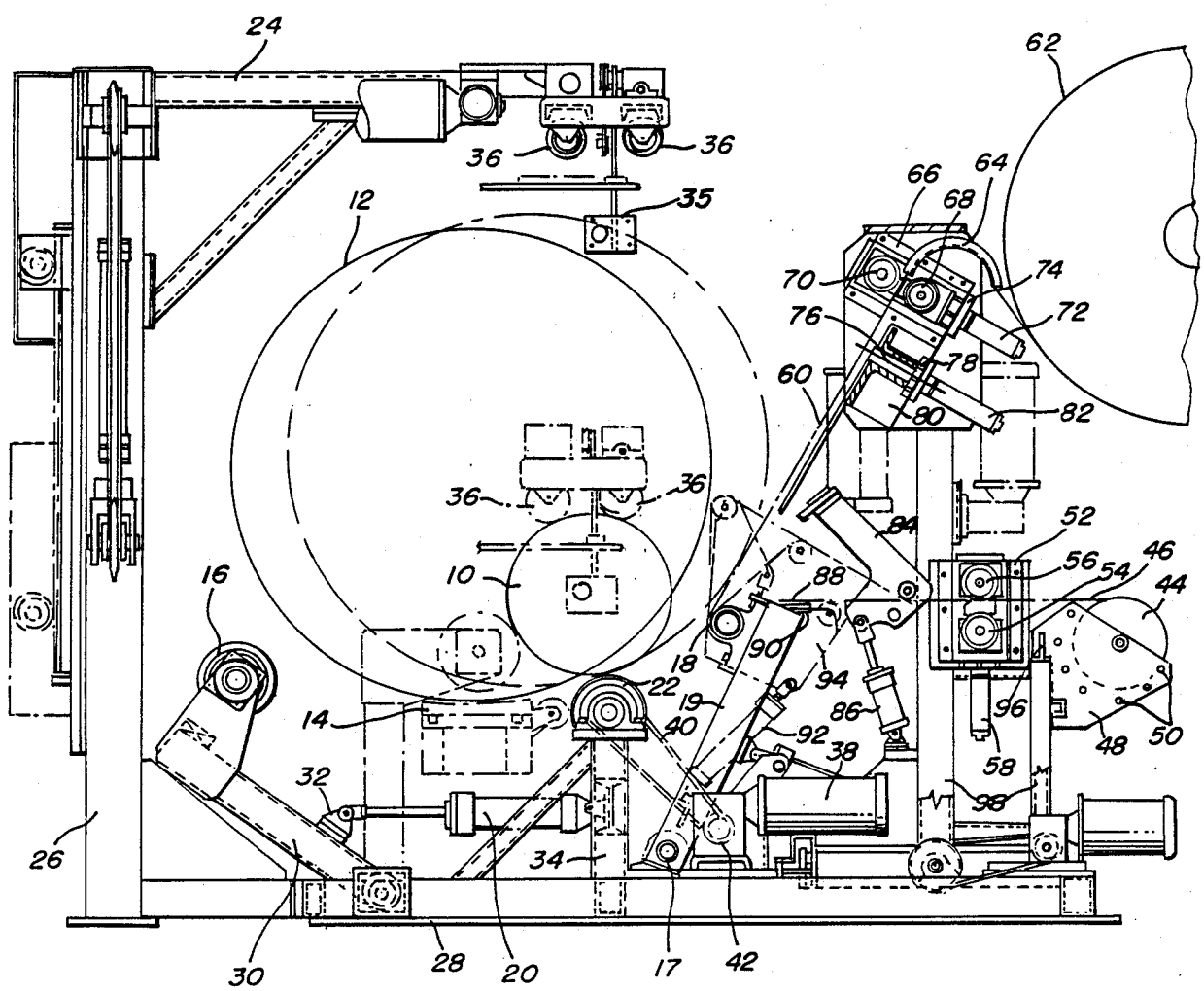
FIG. 1 is a side view of a device for providing core-horizontal interleaved film and foam wrapping around a roll of carbonless paper.

FIG. 1 is a side view of a device for providing core-horizontal interleaved film and foam wrapping around a roll of carbonless paper. A roll of carbonless paper typically varies from 24 inches in diameter such as that shown at 10, to 51 inches as a maximum diameter such as that shown at 12. Depending upon the end use of the carbonless paper, the width thereof will also vary. Unprotected rolls of pressure-sensitive paper are loaded onto a movable conveyor 14 prior to a wrapping operation. The conveyor 14 is then actuated to position the roll 10 or 12 in a rest position between a kicker roll 16 shown in its rest position and a nip roll 18 positioned in an opposing relationship to kicker roll 16. Nip roll 18 is affixed to one end of a nip roll arm 19 which pivots about a nip roll pivot shaft 17.

Kicker roll 16 is supported by a pivoting kicker arm 30, the kicker arm 30 being automatically actuated by hydraulic cylinder 20 to press the kicker roll 16 against a roll of carbonless paper, either roll 10 or roll 12, and press the same up into a wrapping position such that the weight of the roll of carbonless paper substantially rests on rotator roll 22. The carbonless roll of paper is thus securely positioned in a supporting relationship by kicker roll 16, rotator roll 22, and nip roll 18. The hydraulic cylinder 20 grips the kicker arm 30 via a mounting bracket 32 and is anchored at its opposing end to a rotator roll support 34. The rotator roll support 34 is fixed to base 28 of the wrapping structure.

A hold-down arm 24 is supported by a vertically extensible support beam 26 in an inverted "L" shape.

The base 28 supports the remainder of the film and foam wrapping subassemblies. A pair of opposing roll stabilizers 35 descend from wrapping arm 24 in combination with positioning rollers 36 to securely position the carbonless roll of paper in its wrapping position as it rests on rotator roll 22. At the start of the wrapping operation, rotator roll 22 rotates in a counterclockwise direction in order to rotate the carbonless roll in a clockwise direction. Rotation of the rotator roll 22 is accomplished by a first d.c. motor 38 or other similar power source which causes rotation of a drive sprocket 42 attached to base 28. A belt or chain 40 passes around drive sprocket 42 and the axis of rotator roll 22 to cause rotation thereof upon power-up of the motor 38.

Upon initiation of the rotation of the carbonless roll (10 or 12), stretch film 46 is fed from film roll 44 toward the rotating roll of carbonless paper. The leading edge of stretch film 46 may be secured to the carbonless roll 15 by a double-faced splicing tape 88 at a vacuum plate 90 so that the stretch film 46 is attached to the carbonless roll upon its initial contact with the stretch film 46.

The vacuum plate 90 is supported by a vacuum plate actuator arm 94 which is in turn operated by a vacuum plate air cylinder 92.

The roll of stretch film 44 is held in a film cradle 48 and is in frictional contact with a plurality of spring retarded omni rollers 50 set in the film cradle 48.

The stretch film is guided through a pinch roll gib 52 including an idler pinch roll 54 and a driven pinch roll 56. A spring return air cylinder 58 is provided in a position beneath the pinch roll gib 52 for selectively bringing the idler pinch roll 54 into contact with the driven pinch roll 56 when stretch film 46 is being fed toward the rotating carbonless roll.

After approximately one-half rotation of the carbonless roll, wrapping foam 60 is fed from a foam wrapping roll 62 through a foam guide 64 and a pinch roll mounting angle 66 toward the rotating roll until it is inserted between the stretch film 46 and the rotating carbonless roll at a tangential angle to the rotating carbonless roll. The pinch roll mounting angle 66 includes a foam idler pinch roll 68 and a foam driven pinch roll 70. A spring return air cylinder 72 is mounted to the pinch roll mounting angle 66 by a cylinder mounting plate 74. The spring return air cylinder 72 selectively brings the idler pinch roll 68 into contact with the driven pinch roll 70 when foam 60 is being fed from microfoam roll 62 toward the rotating carbonless roll. The carbonless roll rotates so that stretch film 46 and packaging foam 60 are interleaved in a layered type relationship around the periphery of the carbonless roll. Usually three rotations of the carbonless roll are performed to adequately protect the carbonless roll, but any number of rotations required to achieve a desired roll protection are acceptable. When a sufficient number of rotations have occurred to provide an adequately wrapped package, a foam cutting knife 76 operates to slice the packaging foam 60. The foam cutting knife 76 is mounted within a foam cutoff slide plate 78 which is in turn formed on a foam cutoff mounting bracket 80. The foam cutting knife is responsive to the actuation of a spring return air cylinder 82 provided in connection with the foam cutoff slide plate 78. Subsequent to the cutting operation performed by the foam cutting knife 76, an adhesive applicator assembly, shown generally at 84, is positioned by an air cylinder 86 to direct adhesive toward the trailing edge of foam 60.

The stretch film 46 is cut by film cutting knife 96 after cutting of the packaging foam 60 has occurred so that the stretch film 46 will have a longer trailing edge than the packaging foam 60. Preferably, an additional two rotations of the carbonless roll should be provided in order to finish the wrapped carbonless roll with stretch film. As the stretch film 46 is wrapped around the carbonless roll, it is stretched at the peripheral surface of the roll such that any portions of stretch film 46 overlapping the roll edges tend to shrink and draw the packaging foam 60 up against the ends of the carbonless roll. Thus, there is a differential in the amount of tension applied to the stretch film 46 once it is wrapped around the carbonless roll, which aids in producing a compact final roll package.

Rotation of rotator roll 22 terminates when the wrapped package is complete, and kicker roll 16 falls backward to allow the wrapped package to come to rest once again on conveyor 14. Subsequently, conveyor 14 operates to move the wrapped package away from its position between kicker roll 16 and nip roll 18. The wrapped package can then be manually or automatically removed for convenient stacking and shipping without fear of damaging the carbonless paper thereunder.

The foam utilized in the present process is preferably a fixed width of 14 inches. Whenever a carbonless roll of paper being wrapped is greater in width than about 10½ inches, spiral wrapping is employed to provide sufficient roll surface protection and overlap at the edges of the carbonless roll. Spiral wrapping is achieved by automatically traversing frame member 98 which supports the foam packaging roll 62 and associated feeding elements, the stretch film roll 44 and associated feed elements, across the width of the carbonless roll until the entire width has been spirally wrapped. The remaining procedures are identical to that described in connection with the process of interleaving foam and film onto the carbonless roll in FIG. 1. In order to provide three layers of spiral wrapped foam it will obviously be necessary to rotate the carbonless roll more than three times.

It should be noted that the rotator roll 22 may be substantially greater in width than the width of nip roll 18. This is due to the fact that nip roll 18 need not be of a much greater width than either the packaging foam 60 or stretch film 46 which is being applied to the carbonless roll of paper. The rotator roll 22, however, should be of a great enough width to rotate a relatively large cross-section of a carbonless roll. As such, a large roll can easily be rotated by rotator roll 22, and the carbonless roll can then be spiral wrapped for protection. This arrangement eliminates the need for varying widths of stretch film 46 and packaging foam 60, thus reducing materials costs and the problems associated with predicting the widths of supplies.

Figure 2:
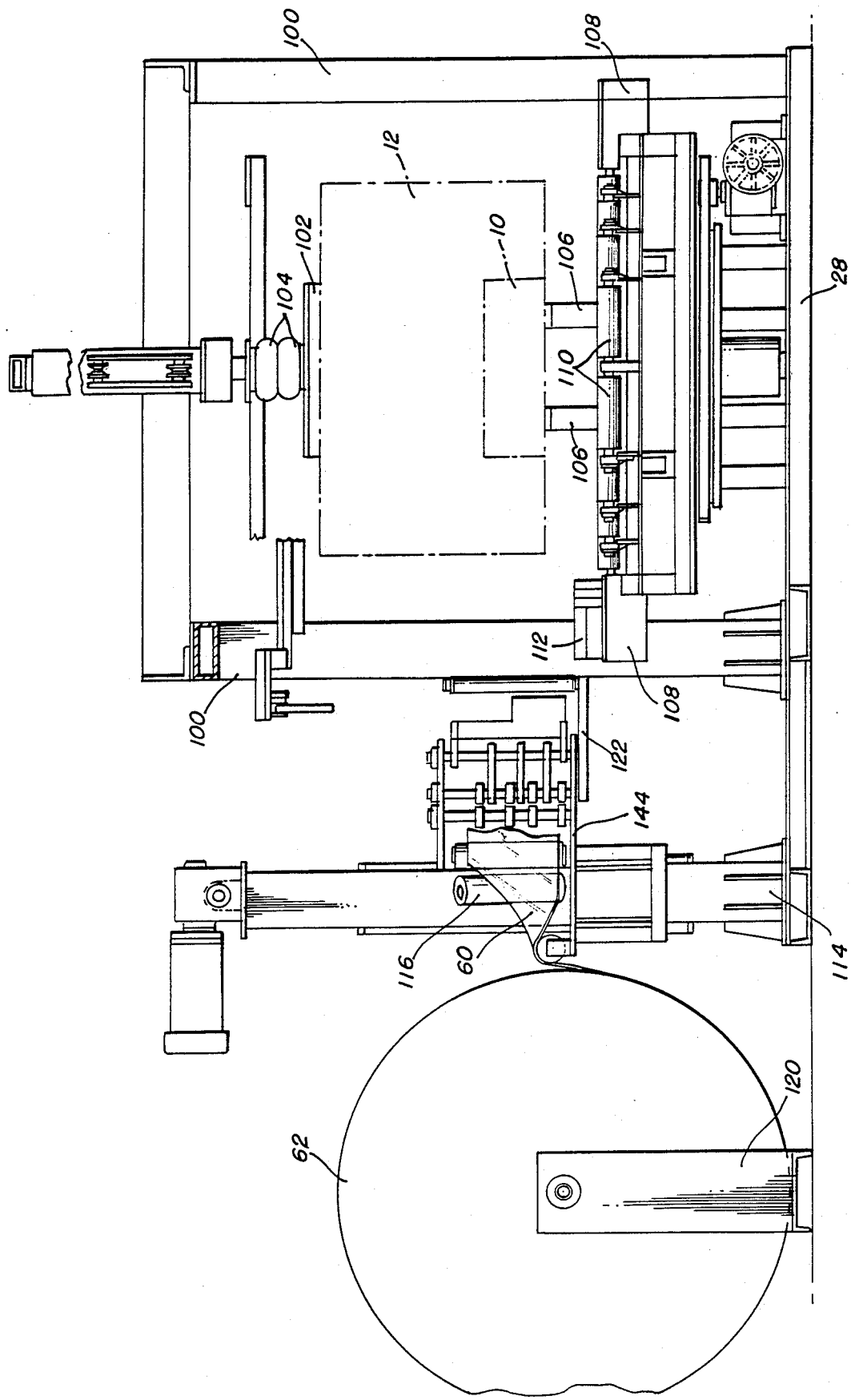
FIG. 2 is a side view of a device for providing core-vertical interleaved film and foam wrapping around a roll of carbonless paper.

FIG. 2 is a side view of a device for providing core-vertical interleaved film and foam wrapping around a roll of carbonless paper. In the core-vertical wrapping operation, frame 100 supports a top platen 102 upon which are provided air bags 104. Beneath the roll of carbonless paper 10 or 12, pop-up arms 106 are provided for lifting the carbonless roll off the conveyor 14 during a wrapping operation. Conveyor side frames 108 support a plurality of conveyor rollers 110 and a film clamping device 112. In the vertical wrapping operation, there is provided a vertical foam roll drive device 114, and a foam turning bar 116 with a foam dispensing head 118.

Figure 3:
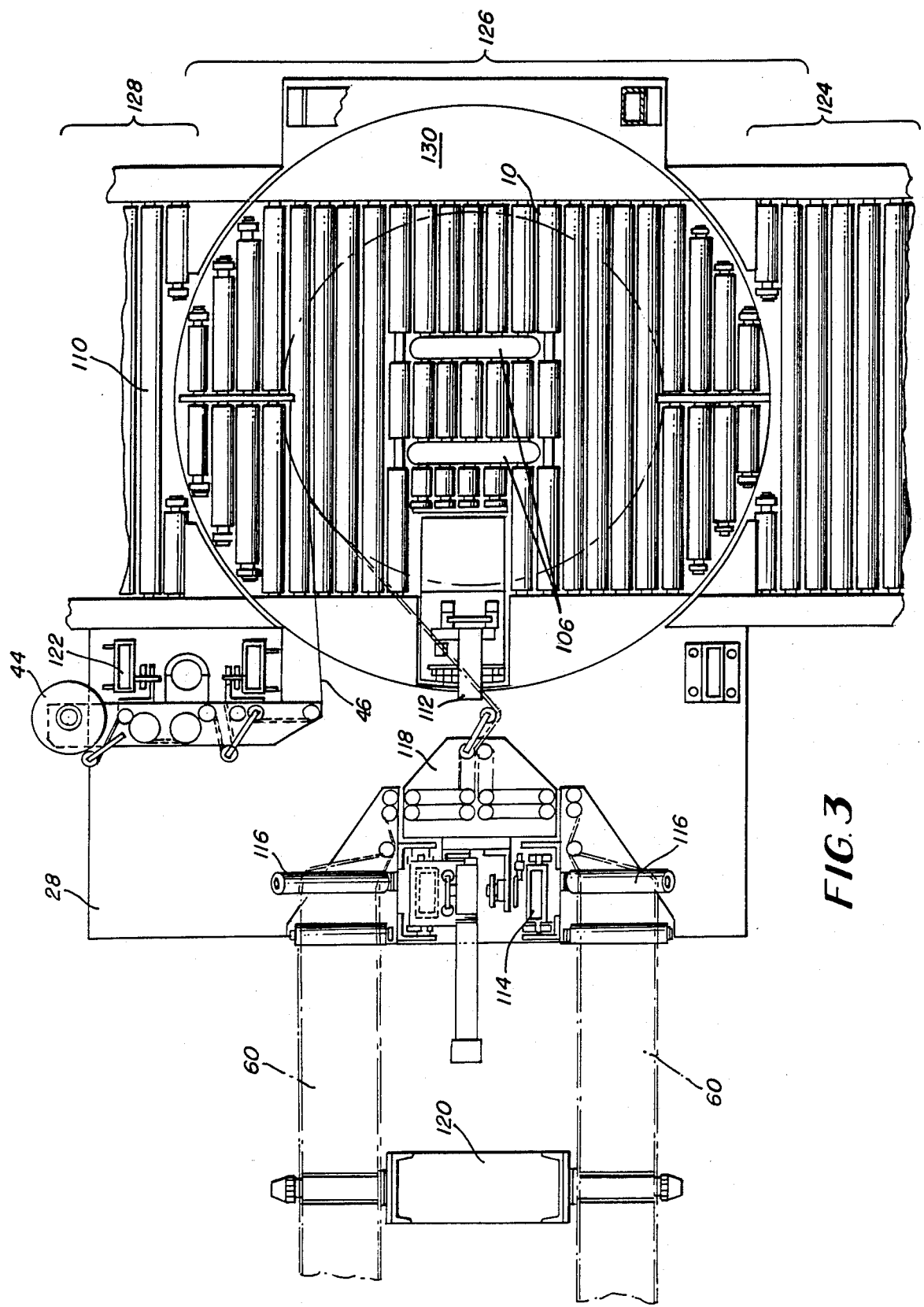
FIG. 3 is a top view of the core-vertical wrapping of FIG. 2.

FIG. 3 is a top view of the core-vertical wrapping device shown in FIG. 2.

It can be seen from FIG. 3 that there are two sources of packaging foam 60 which are fed from a foam roll mandrel 120 toward the foam dispensing head 118, such that upon depletion of one roll of foam, another may be immediately initiated in order to prevent substantial downtime during wrapping operations. Similar to the device shown in FIG. 1, stretch film roll 44 dispenses stretch film 46 toward a rotating roll of carbonless paper. Subsequent to the initiation of wrapping by the stretch film 46, the packaging foam 60 is introduced at a tangential angle between the film 46 and the rotating carbonless roll.

Spiral wrapping may also be achieved by a vertical traversing film dispenser 122 and a vertical traversing foam dispenser 144 which traverse up and down the length of the rotating carbonless roll during the wrapping operation.

As is also shown in FIG. 3, there is provided an infeed conveyor section 124, a spinning conveyor portion 126, and an outfeed conveyor 128 which eliminates the need for manual handling of the rolls of carbonless paper except for initial loading and final unloading onto and from the conveyor, respectively.

The roll of carbonless paper 10 is rotated by a spinning conveyor 126 in a clockwise direction while packaging foam 60 and stretch film 46 are applied thereto. A turntable 130 is positioned such that pop-up arms 106 are centrally located beneath the carbonless roll and the spinning conveyor 126. The spinning conveyor 126 acts as a turntable in the wrapping operation, but then aids in the removal of the wrapped carbonless roll toward the outfeed conveyor 128 subsequent to a wrapping operation.

Figure 4:
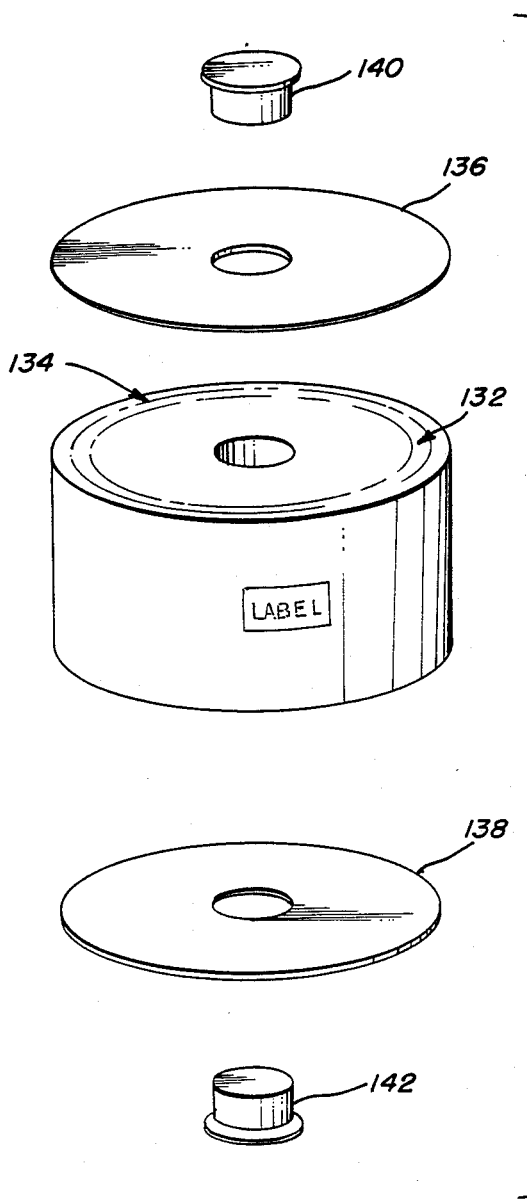
FIG. 4 is an exploded plan view of a completed wrapped package of the present invention.

FIG. 4 is an exploded plan view of a completed wrapped package of the present invention.

Regardless of the width of the roll of carbonless paper, the roll is covered with interleaved film and foam to a thickness of from ¼ to ½ inch. The film and foam will overlap the edges of the carbonless roll as shown at 132 from about 2 to about 5 inches. Segments of a ¾ inch wide double-faced tape 134 are applied to the film overlap 132 in a circular pattern approximately 1½ inches from the edge of the roll to the center of the tape so that end pieces 136 and 138 can be firmly affixed in a manual press-on type fashion to the film edge. The pieces are substantially the diameter of the wrapped package roll so that the entire roll of carbonless paper is protected by either film and foam or the corrugate headers. Core plugs 140 and 142 are pushed into the core of the carbonless roll in order to position and hold the end pieces flush to the roll. The resulting package is produced as a result of the wrapping process performed by the foam wrapper, and yield interleaved foam and film layers tightly wrapped about the face and edges of a roll of carbonless paper to provide a total package material thickness of from ¼ to ½ inch. The finished package is free of wrinkles, bagginess and waffling and has a smooth tight overlap around the edges.

To provide the foam wrap process and package of the present invention, a stretch film of 150 gauge to 200 gauge of either low linear density polyethylene (LLDPE) or polyvinyl chloride (PVC) stretch film may be used. Additionally, any one of several polyolefin packaging foams, such as polypropylene or polyethylene having approximately a ⅛ inch thickness may be used. A double-faced splicing tape, preferably approximately ¾ inch wide is also used. The corrugate headers are of the "E" type with a 3 inch diameter center hole to correspond to the core of the roll of carbonless paper. The core plugs utilized are generally of a plastic flanged type.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A process for producing a foam wrap package for protecting a roll of carbonless paper, consisting essentially of the steps of:

feeding a layer of stretch film from a single source of stretch film toward a roll of carbonless paper in a wrapping position;

feeding a layer of packaging foam from a single source of packaging foam toward said roll of carbonless paper in said wrapping position;

simultaneously wrapping under tension interleaved layers of said single stretch film and packaging foam onto a roll of carbonless paper;

terminating the wrapping of said packaging foam onto said roll of carbonless paper; and terminating the wrapping of said stretch film onto said roll of carbonless paper subsequent to the step of terminating the wrapping of said packaging foam to form a roll package having multi-layers formed from two webs surrounding the roll.

2. A process for producing a foam wrap package for protecting a roll of carbonless paper, consisting essentially of the steps of:

(a) feeding a layer of stretch film from a single source of stretch film toward a roll of carbonless paper in a wrapping position;

(b) feeding a layer of packaging foam from a single source of packaging foam toward said roll of carbonless paper in said wrapping position subsequent to said step of feeding said stretch film;

(c) rotating said roll of carbonless paper in said wrapping position for simultaneously interleaving said single stretch film and said packaging foam, both under tension, in a wrapping operating;

(d) terminating the feeding of said packaging foam to said roll; and (e) terminating the feeding of said stretch film to said roll subsequent to said step of terminating the feeding of said packaging foam to form a roll package having multi-layers formed from two webs surrounding the roll.

3. The process according to claim 2, further including the step of traversing a roll of stretch film and a roll of packaging foam during the wrapping operation in the same direction with respect to said roll of carbonless paper for spiral wrapping of said roll of carbonless paper, said roll of carbonless paper having a width greater than the widths of said roll of stretch film and said roll of packaging foam.

4. A process for producing a foam wrap package for protecting a roll of carbonless paper including both ends of said roll of carbonless paper, consisting essentially of the steps of:

(a) loading a roll of said carbonless paper onto a conveyor;

(b) positioning said roll of carbonless paper between a roll lifter and a feed roll;

(c) lifting said roll of carbonless paper toward said feed roll with said roll lifter onto a drive roll to a wrapping position for a wrapping operation;

(d) rotating said roll of carbonless paper about a center axis in said wrapping position;

(e) feeding a layer of stretch film from a single source of stretch film toward said roll of carbonless paper in said wrapping position;

(f) securing a leading edge of said stretch film to said rotating roll of carbonless paper;

(g) feeding a layer of packaging foam from a single source of stretch film toward said roll of carbonless paper in said wrapping position subsequent to said step of feeding said stretch film;

(h) rotating said roll of carbonless paper in said wrapping position for interleaving said single stretch film and said packaging foam, both under tension, in a wrapping operating;

(i) cutting said packaging foam to terminate the feeding thereof to said rotating roll of carbonless paper;

(j) cutting said stretch film subsequent to said step of cutting said packaging foam to terminate the feeding thereof to said rotating roll of carbonless paper, wherein the tension from said layer of stretch film draws said layer of packaging foam up against both ends of said roll of carbonless paper to cause said layers of stretch film and packaging foam to overlap both ends of said roll of carbonless paper;

(k) applying segments of a double-faced splicing tape in a circular pattern to edges of interleaved foam and film which overlap said ends of said roll of carbonless paper;

(l) terminating rotation of said roll of carbonless paper to form a roll package having multi-layers formed from two webs surrounding the roll.

(m) lowering said roll of carbonless paper to said conveyor;

(n) conveying the foam wrap package to an unloading station; and (o) removing said foam-wrap package from said unloading station.

5. The process according to claim 4, wherein said step of positioning said roll of carbonless paper is by means of said conveyor.

6. The process according to claim 4, wherein said steps of lifting and lowering said roll of carbonless paper to and from a wrapping position, respectively, is by said roll lifter, whereby said roll rests substantially on said drive roll in said wrapping operation.

7. The process according to claim 4, wherein said step of securing a leading edge of said stretch film is by means of a double-faced splicing tape attached to said roll of carbonless paper and the leading edge of said stretch film.

8. The process according to claim 4, further including means for traversing a roll of stretch film and a roll of packaging foam in the same direction during the wrapping operation for spiral wrapping said roll of carbonless paper having a width greater than the widths of said roll of stretch film and said roll of packaging foam.

9. The process according to claim 4, wherein the core of said roll of carbonless paper is in a horizontal orientation.

10. The process according to claim 4, wherein the core of said roll of carbonless paper is in a vertical orientation.

11. A process according to claim 1, wherein said stretch film and packaging foam are both spirally wrapped in the same direction.

12. A process according to claim 1, wherein the tension from said layer of stretch film draws said layer of packaging foam up against both ends of said roll of carbonless paper.

13. A process according to claim 2, wherein the tension from said layer of stretch film draws said layer of packaging foam up against both ends of said roll of carbonless paper.

* * * * *